United States Patent
Spilker et al.

(12)

(10) Patent No.: US 6,280,127 B1
(45) Date of Patent: Aug. 28, 2001

(54) SHOCK ABSORBER ATTACHMENT FOR CONTAINERS

(75) Inventors: Harry Spilker, Bad Münder (DE); Bill Jones, Costa Mesa, CA (US)

(73) Assignee: GNB Gesellschaft fur Nuklearbehalter mbH, Essen (DE)

( * ) Notice: Subject to any disclaimer, the term of this patent is extended or adjusted under 35 U.S.C. 154(b) by 0 days.

(21) Appl. No.: 09/658,949

(22) Filed: Sep. 11, 2000

(51) Int. Cl.$^7$ .................................................. B60P 7/16
(52) U.S. Cl. ................................ 410/88; 410/87; 410/47; 410/48; 410/120
(58) Field of Search .................................. 410/47, 48, 49, 410/50, 87, 88, 120; 206/398, 413, 414, 446; 376/272

(56) References Cited

U.S. PATENT DOCUMENTS

| | | | |
|---|---|---|---|
| 2,670,166 | * 2/1954 | Applegate | 410/49 X |
| 2,958,493 | * 11/1960 | Ashworth | 410/48 |
| 3,061,255 | * 10/1962 | Gallo et al. | 410/48 |
| 3,371,899 | * 3/1968 | Johnson | 410/88 |
| 3,508,503 | * 4/1970 | Daly | 410/49 |
| 3,999,059 | * 12/1976 | Ricks et al. | 410/47 |
| 4,789,118 | * 12/1988 | Byers | 410/49 X |
| 4,861,205 | * 8/1989 | Wozniak et al. | 410/47 |
| 5,044,846 | * 9/1991 | Richardson | 410/47 |
| 5,513,231 | * 4/1996 | Jones et al. | 410/49 X |
| 5,861,204 | * 1/1999 | O'Sullivan | 410/48 X |

* cited by examiner

*Primary Examiner*—Stephen T. Gordon
(74) *Attorney, Agent, or Firm*—Herbert Dubno

(57) ABSTRACT

A shock absorber for an end of a steel or cast-iron container for the transport of spent-fuel elements is in the form of a casing with a recess receiving the end of the container and having, in turn, a stepped-pyramid element which decreases in wall thickness from the region surrounding the container end of a free end of the stepped pyramid.

8 Claims, 3 Drawing Sheets

SHOCK ABSORBER ATTACHMENT FOR CONTAINERS

FIELD OF THE INVENTION

Our present invention relates to a shock-absorber attachment for a cover region or bottom region of a metal container, especially a high-strength steel or cast metal (cast iron) container for the transportation of radioactive material, especially depleted nuclear reactor fuel elements.

More particularly, the invention relates to a shock absorber which can be fitted onto or over the cover region and/or the bottom region of such a container and will absorb impact and like shocks which would otherwise be transmitted to the container and could contribute to weakening or rupture thereof.

BACKGROUND OF THE INVENTION

High-strength metal containers, usually of a high-strength steel or cast iron with or without strengthening reinforcements, are utilized inter alia for the storage and transportation of radioactive materials, for example spent nuclear fuel elements. Such containers may be shipped in various vehicles or vessels, supported against movement in frames or otherwise, and must contain the nuclear material in a perfectly sealed manner such that accidental release of contained materials can be reliably avoided.

To protect the ends of the container, e.g. the cover end or bottom region opposite the cover end, it has been proposed to attach a shock-absorber unit to the respective end.

For this purpose, the shock-absorber units which have been provided heretofore are composed of metal and are themselves container-like members which can be filled with or can receive a nonmetallic filling material. They can have a recess for the container end to be fitted therein and can be attached to the respective container end by screws or bolts.

The earlier shock-absorber systems were formed with radial ribs extending over part of the container end received therein.

Wood structures were received in the shock-absorber unit and the shock responsive region was confined more or less to the region overlapped by the shock absorber. In the case of a horizontal orientation of the container and with certain types of impact for shock, such shock absorbers offered only limited deformation volume and thus were inadequate.

OBJECTS OF THE INVENTION

It is, therefore, the principal object of the present invention to provide a shock-absorber attachment for the purposes described which will afford a significantly greater shock-absorbing and deformation volume in the case of a horizontal orientation of the container than has been obtained with shock absorbers of the type described heretofore or the shock-absorber attachments hitherto used for the ends of the metal containers for the transport of radioactive materials.

Another object of the invention is to provide a shock-absorber attachment for such a container which is more effective for a greater number of situations than has hitherto been the case with respect to such shock absorbers.

Still another object of the invention is to provide a low-cost, high-efficiency shock absorber which has a greater deformation volume and an increased area over which shock can be distributed than with shock absorbers for containers heretofore.

SUMMARY OF THE INVENTION

These objects are attained, in accordance with the invention, in a shock-absorber attachment which can be fitted onto the cover region or bottom region of a high-strength steel or cast-iron container, especially for the transport of radioactive material like spent nuclear-fuel elements, in which the shock-absorber unit is formed beyond the respective container end with a stiff pyramidic structure commencing at the respective container end and narrowing inwardly therefrom and provided with a step-reduction in the wall thickness toward the free outer side and filled with a synthetic-resin foam.

More particularly, the shock-absorber attachment of the invention for a cover or bottom region of a metal container for the transport of radioactive materials can comprise:

a shock-absorber casing formed with a recess receiving a respective end of the container and provided with means for bolting the casing to the end;

a metal punch-through-preventing plate received in the casing and spaced from the end of the container;

an angle-section ring forming part of the casing and surrounding the end of the container around the recess, the ring being formed with radial ribs spaced apart around the ring and spanned between flanges thereof;

a stepped-pyramidal element extending in the casing outwardly from the ring and the end of the container toward a free side of the casing opposite that which receives the end of the container, the stepped-pyramidal element being composed of metal sheet and having wall thicknesses decreasing stepwise from the end of the container toward the free side; and a synthetic resin foam in the casing filling interstices thereof and in contact with the stepped-pyramidal element.

With the shock absorber of the invention, the stepped-pyramidal element provides a significant increase in the shock-absorbing region, i.e. the region in which the shock energy or force is absorbed or converted to distortion or deformation. The stepped pyramid has been found to be especially effective for the case in which the container is horizontally oriented since in the horizontal case it provides a greater internal stiffness and a crumbling or creasing zone with reduced lag time by contrast with the vertical case. The use of a synthetic-resin foam as a damping material filling the shock absorber simplifies manufacture, since it can be foamed in place and provides a more uniform force distribution than is obtainable with other fillers and without a filler.

According to a feature of the invention, the shock-absorber casing is rotationally symmetrical for use with a cylindrical container. The stepped pyramid should surround a central opening or a hollow extending from the outer side or free side of this pyramid to a punch-through-preventing plate received in the casing. It has been found to be advantageous, moreover, to provide the metal foam as a polyurethane foam and to provide the foam externally of the stepped-pyramid element such that it has a higher hardness (stiffness) than the foam within the stepped-pyramid element.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
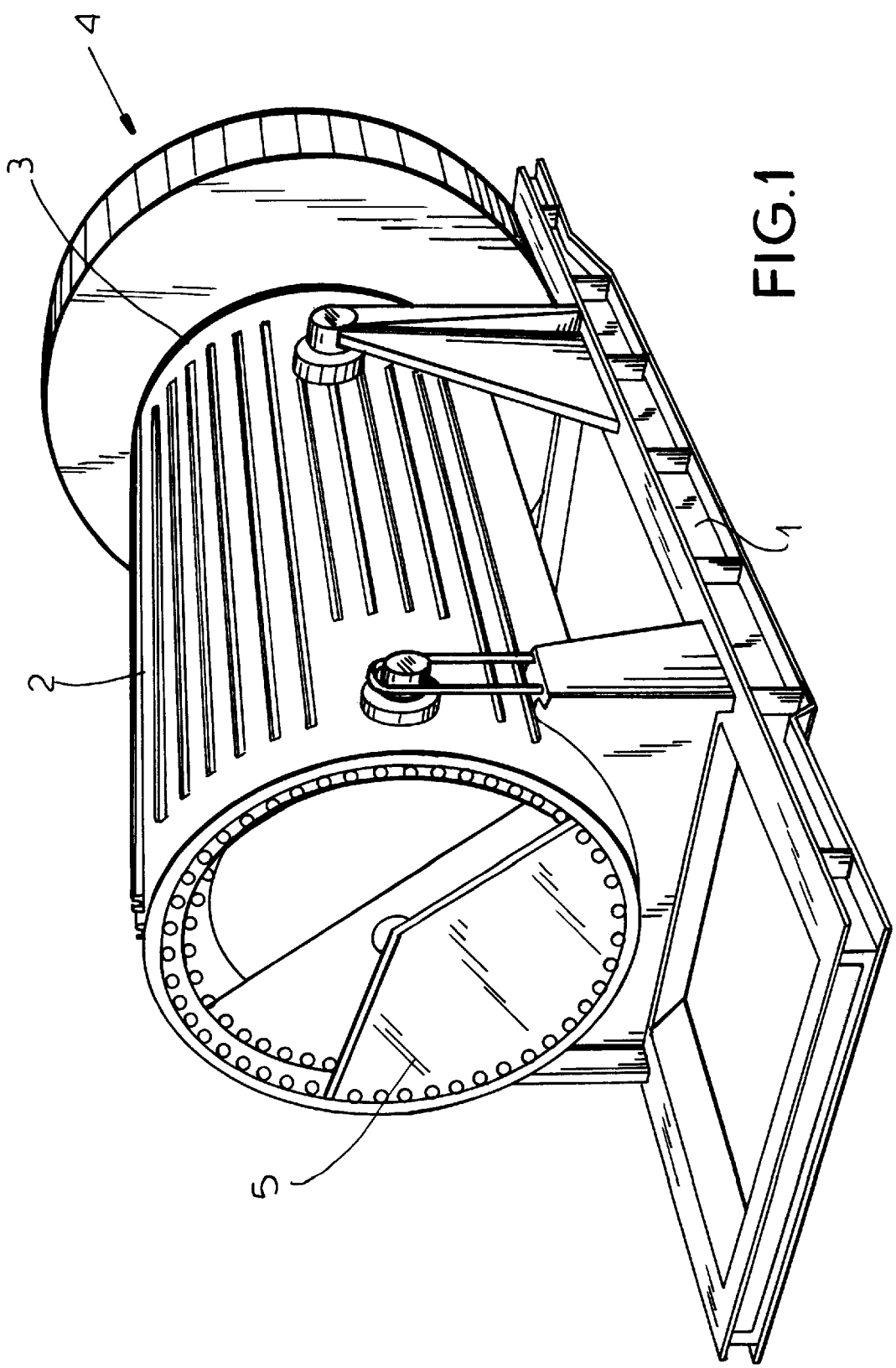
FIG. 1 is a perspective view partly broken away of a container provided with shock-absorbing attachments at the ends thereof.

FIG. 1 shows a container 2 for the transport of depleted nuclear reactor fuel elements which is mounted in a frame 1 which can be placed upon or formed part of the transport vehicle.

The circular cylindrical container 2 is composed of steel or cast iron. A shock-absorber unit 4 is mounted on the bottom region 3 of the container and a similar shock absorber can be provided on the cover region 5 of the container. The cover has been shown partly broken away in FIG. 1.

Figure 2:
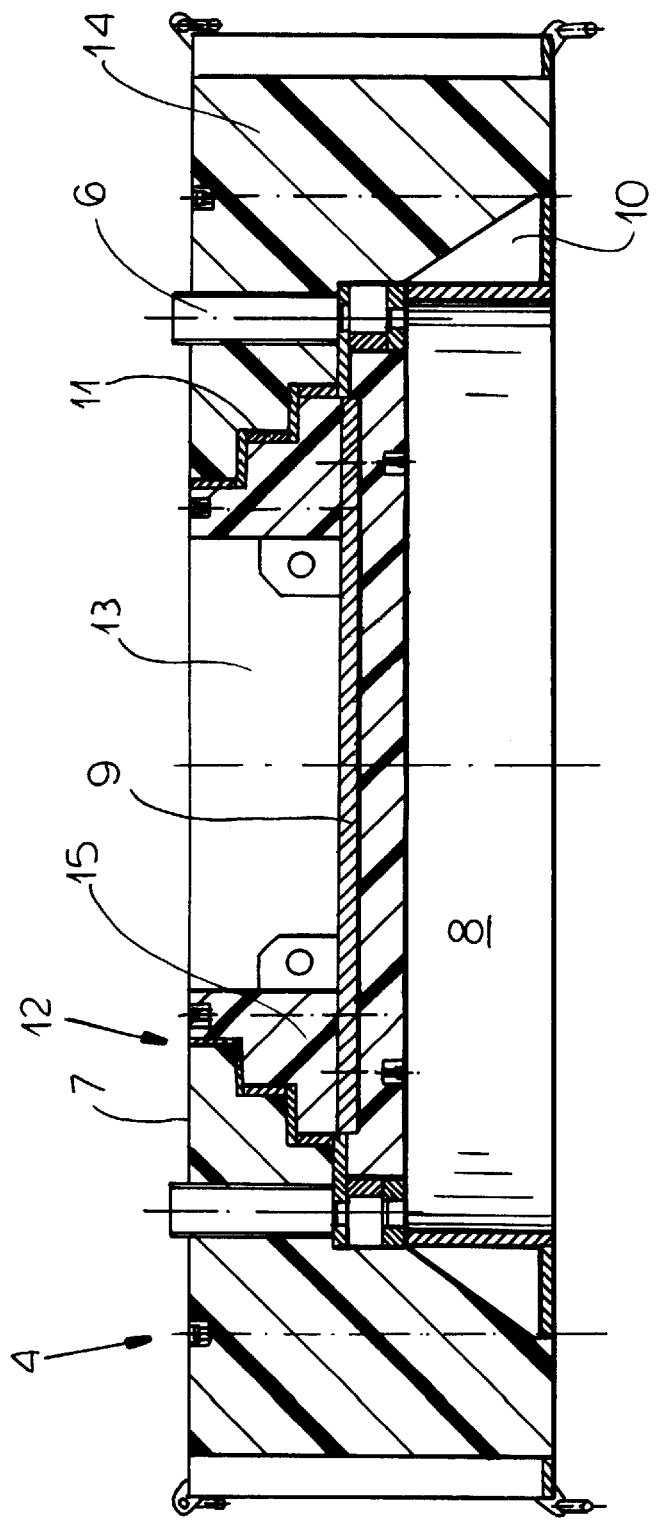
FIG. 2 is a longitudinal section through one of the shock-absorber attachments of FIG. 1.
Figure 3:
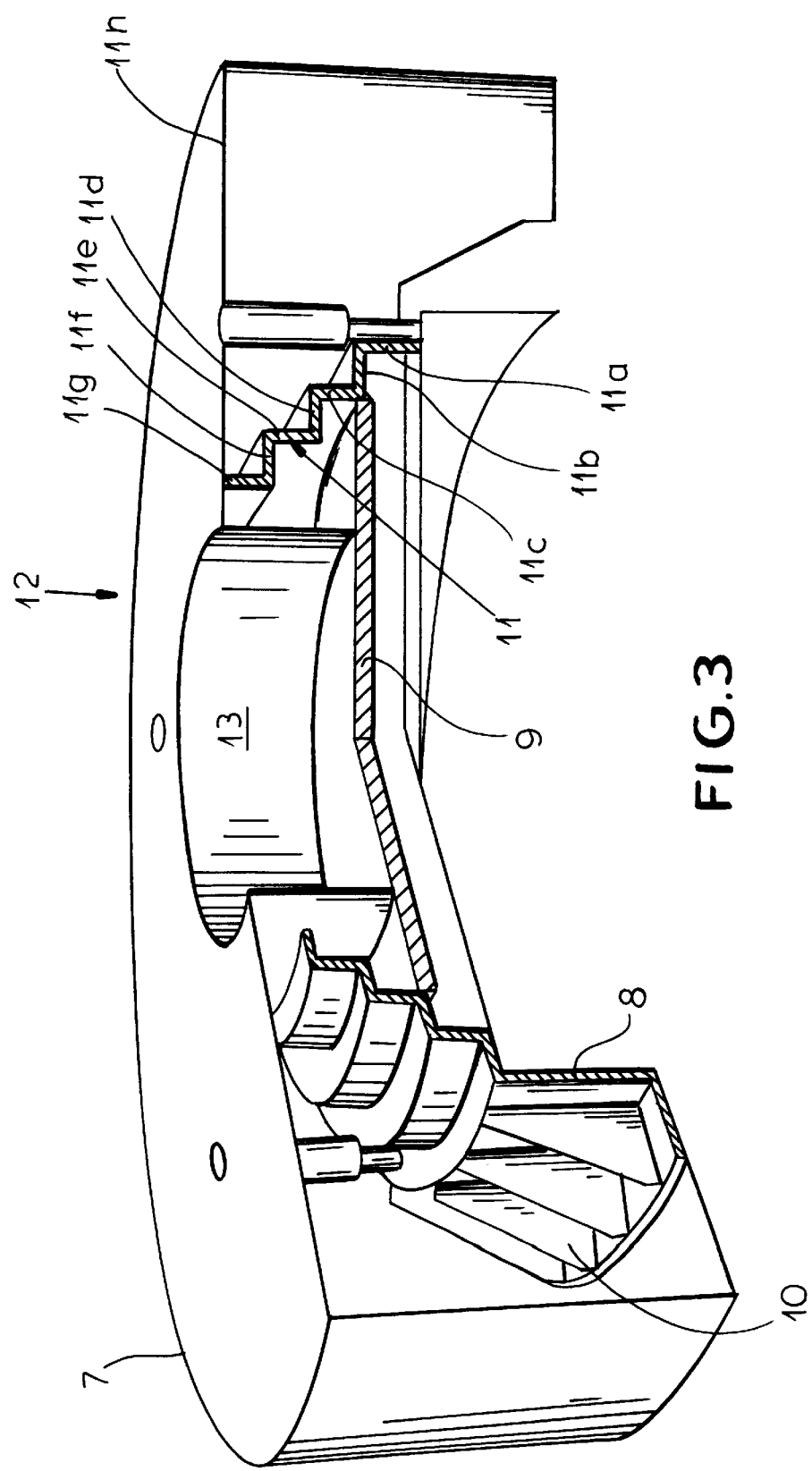
FIG. 3 is a perspective view, also broken away, of the shock absorber before it is filled with the polyurethane foam.

As can be seen from FIGS. 2 and 3, the shock-absorber accessory 4 is composed of sheet metal, especially sheet steel, with the parts thereof welded together. The shock absorbers are affixed to the respective container ends 3 and 5 by means of threaded bolts 6. The shock absorbers comprise casings 7 of sheet steel.

Each of these casings 7 is formed at its inner side with a corresponding circular recess 8 receiving the respective container end 3, 5 and each casing includes a metallic plate 9 of armoring steel which is spaced from the respective container end. Armor plate like that used in armored vehicles such as tanks, can be employed as the punch-through preventer.

The punch-through preventer plate 9 is surrounded by a shock-absorber structure 10, 11 within each casing 7.

The shock-absorber structure 10, 11 comprises, in the region overlapping the end of the container a member 10 which is in the form of an angle ring with triangular radial ribs and outwardly from the container end 3, 5, a stepped-pyramid element 11 which has its wall thickness decreasing stepwise from sheet metal member to sheet metal member toward the free outer side 12.

The stepped-pyramid element has, at its side turned toward the container end 3 or receiving the latter, a cross section or dimension which corresponds to the outer cross section or dimension of the container 2 in this region. The stepped-pyramid element decreases in diameter toward the outer side 12. In addition the casing 7 is formed with a central recess which extends within the stepped-pyramid element 11 from the punch-through preventer plate 9 to the outer side 12.

The shock-absorber casing is filled inwardly and outwardly of the stepped-pyramid element with a foamed synthetic resin, i.e. a polyurethane foam, with that portion 14 of the foam which is outwardly of the stepped-pyramid element 11 being harder than the foam 15 inwardly of the stepped-pyramid element.

From FIG. 3 it is possible to see that the stepped-pyramid element 11 comprises a relatively thick cylindrical member 11a which is welded close to its top by circular weld seams to an inwardly-extending annular ring 11b of slightly smaller thickness, the ring 11b lying in a plane perpendicular to the axis of the container and the ring 11a and substantially coinciding with the plane of the punch-through preventing plate 9.

Along the inner edge of the ring 11b a cylindrical ring 11c is welded, the ring 11c having a slightly smaller thickness than the plate 11b. Another annular plate 11d, also lying in a plane perpendicular to the axis, is thinner than the cylinder 11c and is welded to the upper edge thereof.

The circular plate 11d, in turn, is welded to the lower end of a cylinder 11e which is thinner than the plate lid and is welded, in turn, to the outer edge of a plate 11f. The plate 11f lies in a plane perpendicular to the axis and is welded to a further cylinder 11g which has a thickness less than that of the ring 11f. The cylinder 11g is welded to a plate 11h closing the casing 7 at the free end of the stepped pyramid 11.

We claim:

1. A shock absorber attachment for a cover or bottom region of a metal container for transport of radioactive materials, said shock absorber attachment comprising:

a shock-absorber casing formed with a recess receiving a respective end of said container and provided with means for bolting said casing to said end;

a metal punch-through-preventing plate received in said casing and spaced from said end of said container;

an angle-section ring forming part of said casing and surrounding said end of said container around said recess, said ring being formed with radial ribs spaced apart around said ring and spanned between flanges thereof;

a stepped-pyramidal element extending in said casing outwardly from said ring and said end of said container toward a free side of said casing opposite that which receives said end of said container, said stepped-pyramidal element being composed of metal sheet and having wall thicknesses decreasing stepwise from said end of said container toward said free side; and a synthetic resin foam in said casing filling interstices thereof and in contact with said stepped-pyramidal element.

2. The shock absorber attachment defined in claim 1 wherein said casing is rotation symmetrical.

3. The shock absorber attachment defined in claim 2 wherein said casing is formed with a cavity extending from said free side to said plate.

4. The shock absorber attachment defined in claim 3 wherein said synthetic resin foam is a polyurethane foam.

5. The shock absorber attachment defined in claim 4 wherein a portion of said synthetic resin foam is outside said element and is harder than a portion of the synthetic resin foam inside said element.

6. The shock absorber attachment defined in claim 1 wherein said casing is formed with a cavity extending from said free side to said plate.

7. The shock absorber attachment defined in claim 1 wherein said synthetic resin foam is a polyurethane foam.

8. The shock absorber attachment defined in claim 1 wherein a portion of said synthetic resin foam is outside said element and is harder than a portion of the synthetic resin foam inside said element.

* * * * *